United States Patent
Bar et al.

(10) Patent No.: US 7,734,123 B2
(45) Date of Patent: Jun. 8, 2010

(54) EVANESCENT III-V SILICON PHOTONICS DEVICE WITH SPIN COAT BONDING

(75) Inventors: Hanan Bar, Jerusalem (IL); Richard Jones, San Mateo, CA (US)

(73) Assignee: Intel Corporation, Santa Clara, CA (US)

( * ) Notice: Subject to any disclaimer, the term of this patent is extended or adjusted under 35 U.S.C. 154(b) by 201 days.

(21) Appl. No.: 12/114,209

(22) Filed: May 2, 2008

(65) Prior Publication Data

US 2009/0274411 A1    Nov. 5, 2009

(51) Int. Cl.
  *G02B 6/12*    (2006.01)
(52) U.S. Cl. .................. 385/14; 385/129; 385/131; 385/30
(58) Field of Classification Search ......... 385/129–132, 385/30, 14
  See application file for complete search history.

(56) References Cited

U.S. PATENT DOCUMENTS 6,852,556 B2 *   2/2005  Yap ..................... 438/22

2007/0170417 A1 *   7/2007  Bowers .................. 257/14

OTHER PUBLICATIONS

Alexe, M., V. Dragoi, M. Reiche, U. Gosele, "Low temperature GaAs/Si direct wafer bonding", Electronics Letters, V. 36, 667-8 (2000).*
"An electrically pumped hybrid silicon evanescent amplifier," H. Park, A. W. Fang, R. Jones, O. Cohen, J. E. Bowers, Optical Fiber Communication Conference (OFC 2007), OTuD2, Anaheim CA, Mar. 2007.*
W.P. Wong, K.S. Chiang, "Calculation of Confinement Factors for Multiple-Quantum-Well Optical Amplifiers by the Effective_index Model", Microwave and optical Technology Letters, vol. 25, No. 4, May 2000, 275-8.*

* cited by examiner

*Primary Examiner*—Charlie Peng
(74) *Attorney, Agent, or Firm*—Cool Patent, P.C.; Joseph P. Curtin

(57) ABSTRACT

Briefly, in accordance with one or more embodiments, a hybrid photonics device comprises a silicon portion having one or more features formed therein, a non-silicon portion comprising one or more photonics devices proximate to the one or more features of the silicon portion, and a bonding layer coupling the silicon portion with the non-silicon portion, the non-silicon portion being bonded to the silicon portion via the bonding layer prior to patterning of the one or more photonics devices.

17 Claims, 6 Drawing Sheets

| NAME | COMPOSITION | DOPING CONCENTRATION | THICKNESS |
|---|---|---|---|
| P CONTACT LAYER | P-TYPE $In_{0.53}Ga_{0.47}As$ | $1 \times 10^{19} cm^{-3}$ | 0.1 μm |
| CLADDING | P-TYPE InP | $1 \times 10^{18} cm^{-3}$ | 1.5 μm |
| SEPARATE CONFINEMENT HETEROSTRUCTURE | P-TYPE $Al_{0.131}Ga_{0.34}In_{0.528}As$, 1.3 μm | $1 \times 10^{17} cm^{-3}$ | 0.25 μm |
| QUANTUM WELLS | $Al_{0.089}Ga_{0.461}In_{0.45}As$, 1.3 μm (9x)<br>$Al_{0.055}Ga_{0.292}In_{0.653}As$, 1.7 μm (8x) | UNDOPED<br>UNDOPED | 10 nm<br>7 nm |
| N LAYER | N-TYPE InP | $1 \times 10^{18} cm^{-3}$ | 110 nm |
| SUPERLATTICE | N-TYPE $In_{0.85}Ga_{0.15}As_{0.327}P_{0.673}$ (2x)<br>N-TYPE InP (2x) | $1 \times 10^{18} cm^{-3}$<br>$1 \times 10^{18} cm^{-3}$ | 7.5 nm<br>7.5 nm |
| N BONDING LAYER | N-TYPE InP | $1 \times 10^{18} cm^{-3}$ | 10 nm |

*FIG. 6*

EVANESCENT III-V SILICON PHOTONICS DEVICE WITH SPIN COAT BONDING

BACKGROUND

Silicon photonics as an integration platform has been a focus of optoelectronics research because of the potential of lower cost manufacturing on the ubiquitous electronics fabrication infrastructure. One challenge for silicon photonics systems is the realization of compact, electrically driven optical gain elements. One way to achieve this is via hybrid silicon (Si) evanescent devices which may include, for example, electrically pumped lasers, amplifiers, and/or photodetectors. Such hybrid Si evanescent devices can be utilized to provide a lower cost, scalable solution for hybrid integration on a silicon based platforms.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

FIG. 6 is a table showing example compositions, doping concentrations, and thickness of individual layers of a III-V portion of a hybrid silicon evanescent device in accordance with one or more embodiments.

Figure 1:
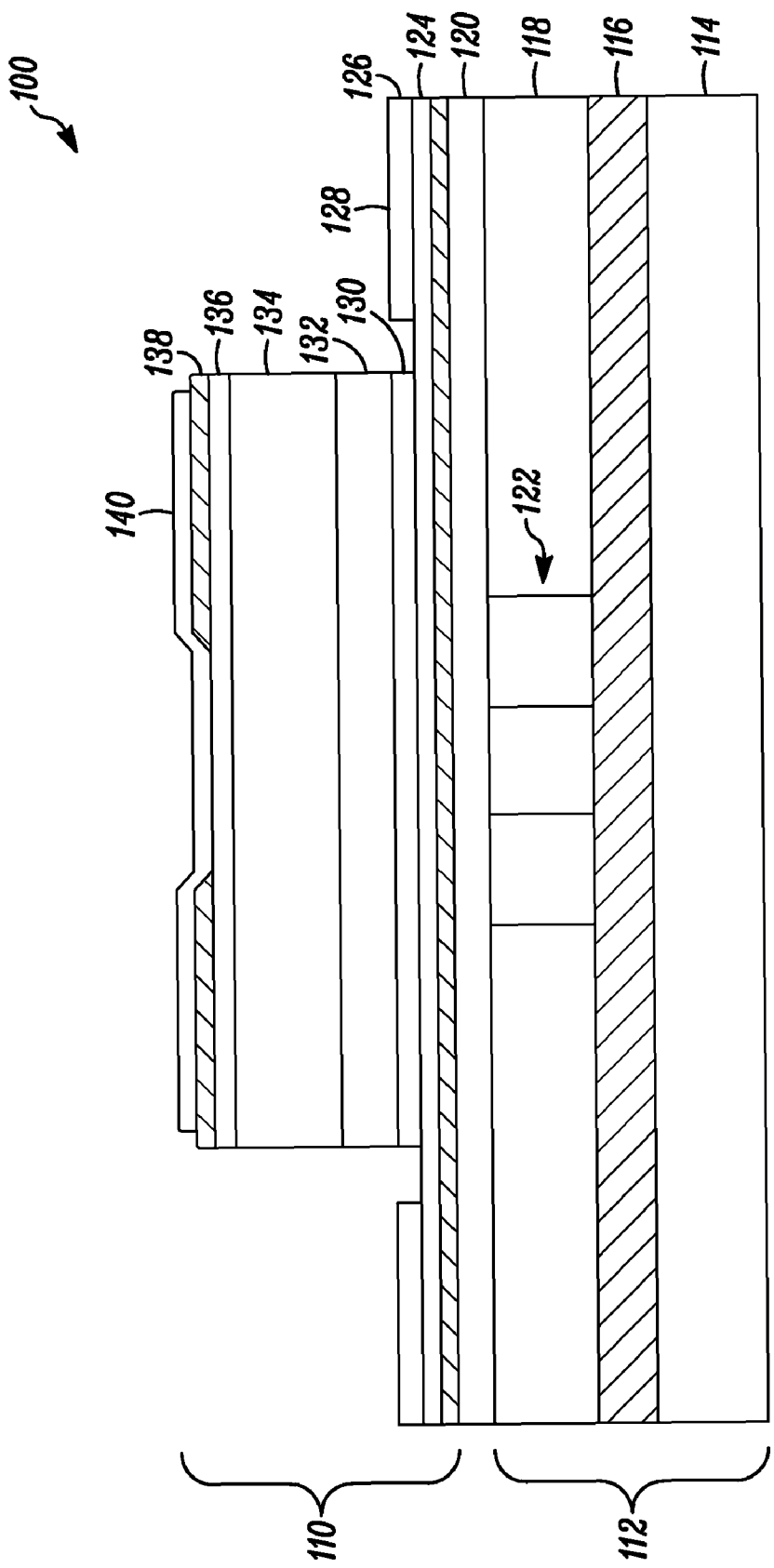
FIG. 1 is an elevation view of a cross section of a hybrid silicon evanescent device in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive- or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, an elevation view of a cross section of a hybrid silicon evanescent device in accordance with one or more embodiments will be discussed. As shown in FIG. 1, hybrid silicon evanescent device 100 may comprise III-V chip 110 bonded to silicon-on-insulator (SOI) wafer 112 bonded via bonding layer 120 to form a hybrid photonics device such as, for example, a laser or a photodetector. It should be noted that although FIG. 1 shows a hybrid silicon evanescent device comprising a III-V chip 110 bonded to a SOI wafer 112, other types of materials may be utilized so that in general hybrid silicon evanescent device 100 may comprise a non-silicon portion bonded to a silicon portion, and the scope of the claimed subject matter is not limited in this respect.

In one or more embodiments, SOI wafer 112 comprises a silicon substrate 114 having a buried oxide layer 116 formed thereon that may comprise, for example, silicon dioxide ($SiO_2$), and a silicon layer 118 formed on buried oxide layer 116. In one or more embodiments, silicon layer 118 may have a silicon waveguide 122 formed therein such as a rib waveguide or the like. Although waveguide 122 may comprise silicon in one or more embodiments, waveguide 122 may comprise other non-silicon materials in one or more alternative embodiments, and the scope of the claimed subject matter is not limited in this respect. In one or more embodiments, silicon waveguide 122 may be fabricated in SOI wafer 112, along with other silicon devices, using a complementary metal-oxide-semiconductor (CMOS) process, although the scope of the claimed subject matter is not limited in this respect.

In one or more embodiments, III-V wafer 110 may comprise a multiple quantum well epitaxial layer structure comprising a superlattice layer 124 comprising n-type indium phosphide (InP) and n-type indium-gallium-arsenide-phosphide (InGaAsP), and n-layer 126 comprising indium phosphide (InP), and an n-contact layer 128 comprising one or more n-contacts formed from an appropriate conductor such as copper (Cu), aluminum (Al), gold (Au), or an alloy such as a titanium gold (Ti/Au) alloy or the like. Furthermore, III-V wafer 110 may comprise a III-V mesa comprising a multiple quantum well (MQW) layer 130 comprising aluminum-gallium-indium-arsenide (AlGaInAs), for example, to form eight or nine quantum wells in MQW layer 130. The III-V wafer 110 may further comprise separate confinement heterostructure (SCH) layer 132 comprising p-type aluminumgallium-indium-arsenide (AlGaInAs), cladding layer 134 comprising indium phosphide (InP), and p-contact layer 136 comprising p-type indium-gallium-arsenide (InGaAs). A p-contact layer 140 may be disposed on a top surface of the III-V mesa to directly contact p-contact layer 136 through a silicon nitride layer 138. P-contact layer 140 may comprise a suitable conductor such the same types of conductor materials as n-contact layer 128. It should be noted that the layers of III-V chip 110 and the composition thereof are merely example arrangements and materials, and the scope of the claimed subject matter is not limited in these respects. A table of an example structure for III-V wafer 110 is shown in and described with respect to FIG. 6, below.

In one or more embodiments, bonding layer 120 may comprise a liquid adhesive that is spin coated on SO1 wafer 112 to allow III-V chip 110 to be bonded to SO1 wafer 112, and then cured. Suitable adhesives that may be utilized for bonding layer 120 may include, but are not limited to, 1,3-divinyl-1, 1,3,3-tetramethyldisiloxanebisbenzocyclobutene (DVS-BCB), spin on glass (SOG), or other suitable types of liquid adhesives. Such an arrangement of hybrid silicon evanescent device 100 allows SOI wafer 112 to be formed including forming one or more silicon waveguides 122 in the SOI wafer 112. Then, an earlier stage III-V chip 110 may be adhered to SOI wafer 112 that will correspond to one or more III-V photonics devices to couple the III-V photonics devices to a corresponding silicon waveguide 122 without requiring a higher degree of placement precision and/or alignment as would otherwise be required with a finalized, or nearly finalized, III-V photonics device. Then, III-V photonics device of III-V chip 110 may be finalized after bonding of the III-V chip 110 to SOI wafer 112. Thus, in one or more embodiments, two or more photonics devices may be integrated with two or more silicon devices via a single bonding step, rather than using a separate bonding step for each photonics device to be integrated one at a time as with typical flip chip type bonding processes. Thus, in one or more embodiments, the arrangement of hybrid silicon evanescent device 100 may be conducive to high volume manufacturing (HVM). Furthermore, bonding layer 120 may be more tolerant to particle and/or organic contaminants than direct bonding via oxide molecular bonding, thereby further facilitating manufacturability of hybrid silicon evanescent device 100. Furthermore, plasma treatment steps may not be required when bonding layer 120 is utilized to bond III-V chip 110 to SOI wafer 112. However, these are merely examples regarding the manufacturability of hybrid silicon evanescent device 100, and the scope of the claimed subject matter is not limited in these respects.

In one or more embodiments, a hybrid photonics device such as hybrid silicon evanescent device 100 may be defined as a device comprising a non-silicon portion, such as III-V chip 110, coupled to a silicon portion, such as SOI wafer 112, in which an optical mode of the silicon portion may at least partially overlap the non-silicon portion. For example, an evanescent wave contained within silicon waveguide 122 of SOI wafer 114 may sufficiently couple with III-V chip 110 so that the III-V chip 110 and silicon waveguide 122 may form a hybrid waveguide. Thus, an optical mode of silicon waveguide 122 of SOI wafer 112 at least partially overlaps with a portion of III-V chip 110 thereby allowing the evanescent beam to obtain gain from III-V chip 110. Such a structure of a hybrid photonics device allows various photonics devices to be constructed by taking advantage of such coupling, for example, lasers, photodetectors, amplifiers, or wavelength converters, and so on. In order to obtain such coupling, bonding layer 120 should be sufficiently thin to allow such coupling, which is further described, below.

Figure 2:
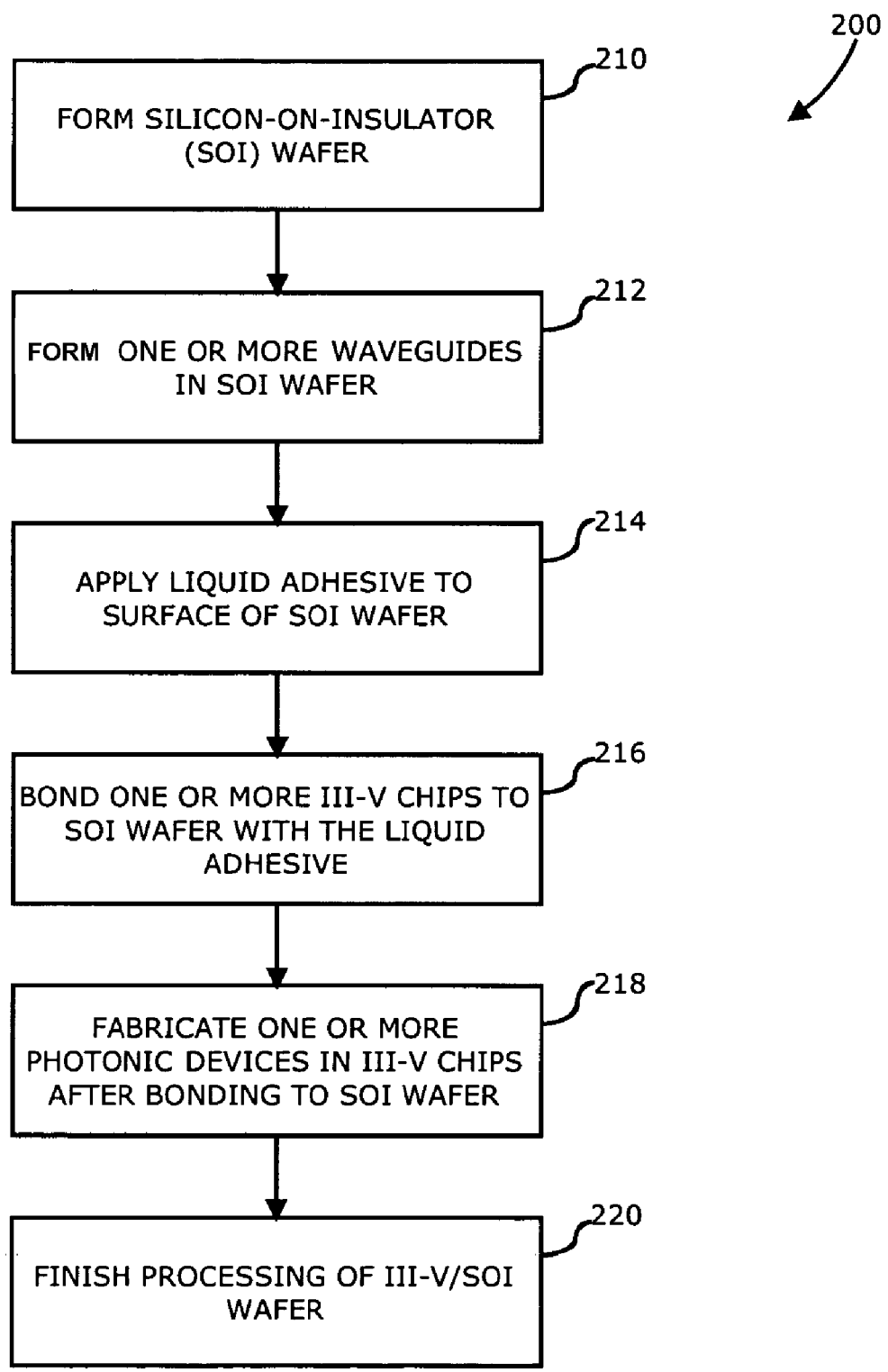
FIG. 2 is a flow diagram of a method for forming a hybrid silicon evanescent device in accordance with one or more embodiments.

Referring now to FIG. 2, a flow diagram of a method for forming a hybrid silicon evanescent device in accordance with one or more embodiments will be discussed. In one or more embodiments, method 200 as shown in FIG. 2 may be utilized to fabricate the hybrid silicon evanescent device 100 of FIG. 1. Although FIG. 2 shows one particular order of the blocks of method 200, other orders may be utilized in other embodiments, and likewise method 200 may include more or fewer blocks than shown in FIG. 2, and the scope of the claimed subject matter is not limited in these respects. At block 210 a silicon wafer such as SOI wafer 112 may be formed, and one or more silicon waveguides 122 may be formed in SOI wafer 112 at block 212. It should be noted that multiple silicon waveguides 122 may be formed in SOI wafer 112 to couple with one or more III-V chips in order to provide one or more hybrid silicon evanescent devices 100 as shown in and described with respect to FIG. 1. Likewise, one or more other silicon devices may be formed in SOI wafer 112, for example resistors and/or capacitors, one or more active devices such as transistors, and/or other structures as desired. In one or more embodiments, the process by which SOI wafer is formed at block 210 and/or one or more silicon waveguides are formed at block 212 may comprise a CMOS process or the like. At block 214 a liquid adhesive may be applied to a surface of SOI wafer 112 to form bonding layer 120 as shown in FIG. 1. In one or more embodiments, such a process by which a liquid adhesive is applied to SOI wafer 112 may comprise a spin coating process, although the scope of the claimed subject matter is not limited in this respect. As described with respect to FIG. 1, above, the liquid adhesive used for bonding layer 120 may comprise DVS-BCB or SOG or the like, or any other suitable adhesive, which may comprise a liquid adhesive or may comprise a non-liquid adhesive such as a gel or other compound.

After a liquid adhesive is applied to SOI wafer 112, one or more III-V chips 110 may be bonded at block 216 to SOI wafer 112 via the liquid adhesive. In one or more embodiments, such a bonding process at block 216 may include a curing step to cure the adhesive, although the scope of the claimed subject matter is not limited in this respect. After one or more III-IV chips 110 are bonded to SOI wafer 112, one or more active photonics devices may be fabricated in the III-V chips 110 to form hybrid silicon evanescent device 100 of FIG. 1. Such devices may comprise, for example, lasers, photodetectors, amplifiers, and/or wavelength converters, although the scope of the claimed subject matter is not limited in this respect. It should be noted that since the photonics devices may be formed in the III-V chips 110 after bonding of the III-V chips 110 to SOI wafer 112, placement and/or alignment of the III-V chips may not be as critical than if the photonics devices were formed in the III-V chips before bonding since the patterning of the III-V chips is not done yet. As a result, the post bonding patterning of the III-V may result in higher precision in formation of the active photonics devices. Such a process may allow for multiple photonics devices to be fabricated simultaneously on SOI wafer 112, for example tens or hundreds of active photonics devices on a single SOI wafer 112, wherein only a single bonding step may be used. Lastly, the processing of the hybrid silicon evanescent device 100 comprising III-V chip 110 bonded to SOI wafer 112 may be finalized at block 220, for example contact layers such as n-contact 128 and/or p-contact 140 may be added to hybrid silicon evanescent device 100, although the scope of the claimed subject matter is not limited in this respect.

Figure 3:
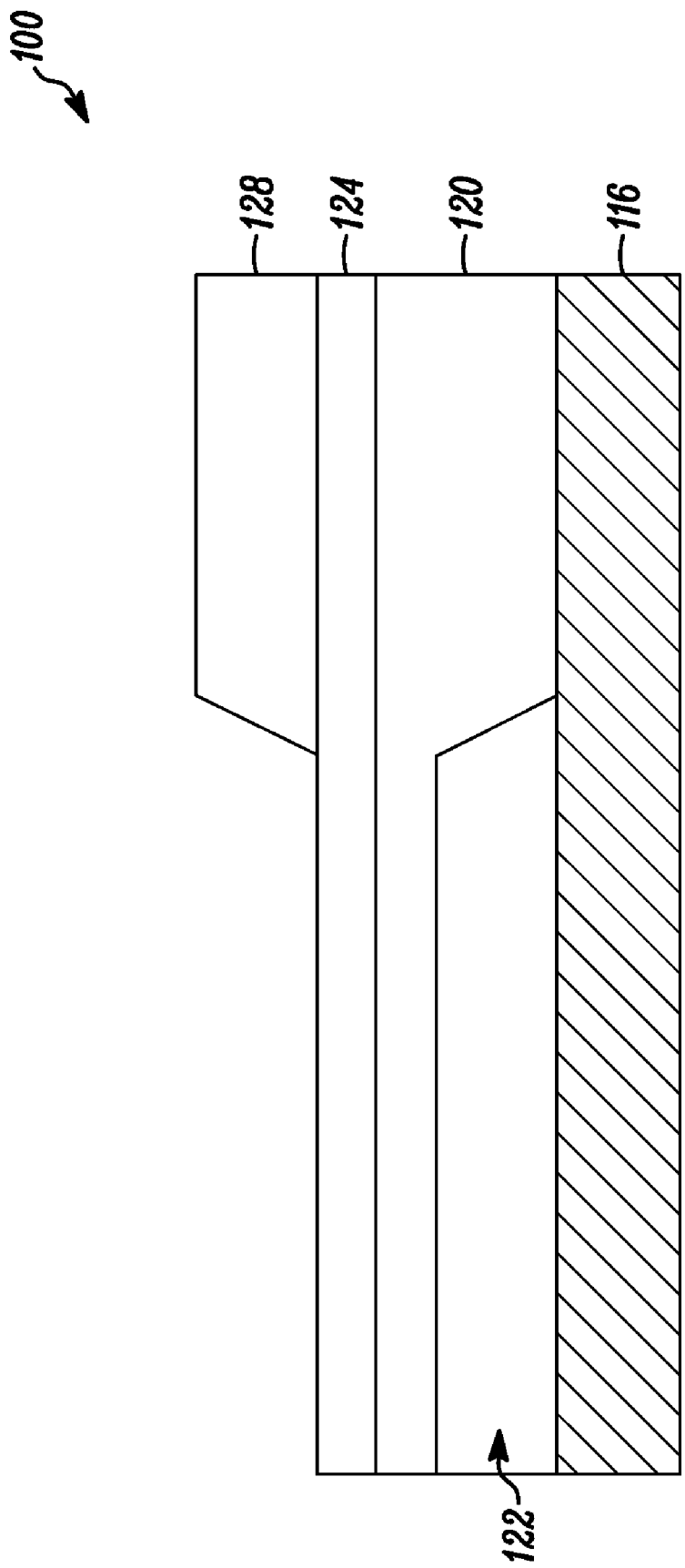
FIG. 3 is an elevation view of a cross section of a hybrid silicon evanescent device showing a boding layer of the device in accordance with one or more embodiments.

Referring now to FIG. 3, an elevation view of a cross section of a hybrid silicon evanescent device showing a boding layer of the device in accordance with one or more embodiments will be discussed. Hybrid silicon evanescent device 100 as shown in FIG. 3 illustrates the relative dimensions between the various layers of the device, however not all layers are necessarily shown and some layers of device 100 may have been omitted for clarity. In one or more embodiments, silicon waveguide 122 is formed in silicon layer 118 disposed on a buried oxide layer 116, wherein the thickness of silicon layer 118 may be about 220 nanometers or so. Likewise, bonding layer 120 may be disposed between superlattice layer 124 and silicon layer 118 and have a thickness of about 100 nanometers or at thinner region of bonding layer 120, wherein the bonding layer 120 may be thicker at the periphery of hybrid silicon evanescent device 100. N-contact layer 128 may be disposed above superlattice layer 124 as shown. As will be discussed further with respect to FIG. 4, below, simulations have shown that providing bonding layer 120 with a thickness of about 100 nm or so does not significantly affect the performance of hybrid silicon evanescent device 100. Furthermore, using a thickness of bonding layer 120 of about 100 nm or so allows the bonding surface of SOI wafer 112 to be generally rougher since the adhesive of bonding layer 120 will be able to fill in and smooth out any rough features of the surface of SOI wafer 112, thereby obviating a need for surface smoothing or polishing steps for SOI wafer 112. Having a relatively thicker bonding layer 120 allows SOI wafer to have rougher surface features and/or require less surface processing and/or polishing since bonding layer 120 may at least partially fill in such surface features, however bonding layer should not be so thick as to not allow sufficient coupling of an optical mode of waveguide 122 of SOI wafer 112 and III-V chip 110. As will be discussed with respect to FIG. 4, below, 100 nanometers may be a suitable thickness for bonding layer 120 in one or more embodiments. However, these are merely example features of hybrid silicon evanescent wafer 100, and the scope of the claimed subject matter is not limited in these respects.

Figure 4:
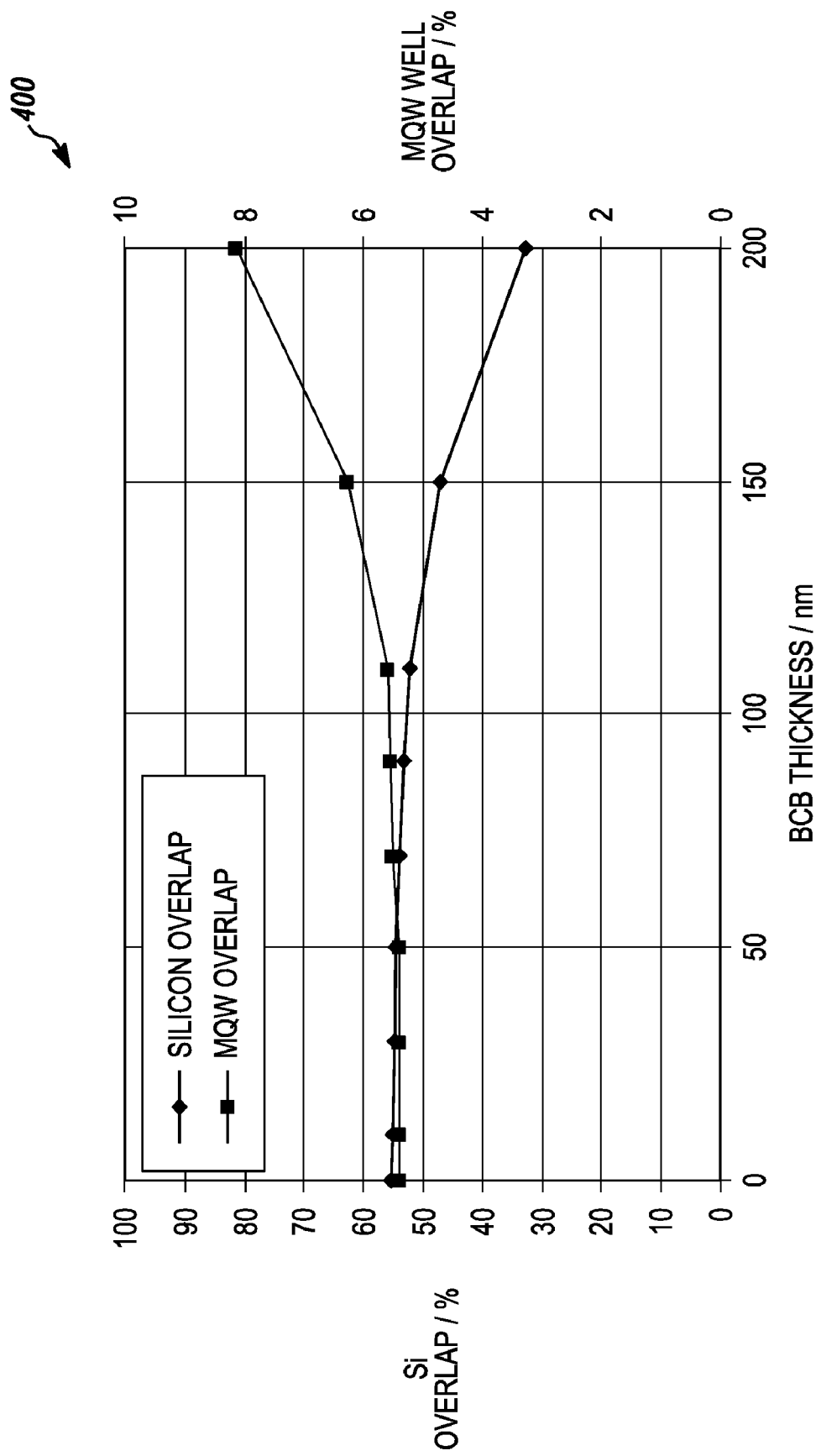
FIG. 4 is a graph of the overlap of optical mode with silicon and multiple quantum well (MQW) region of a hybrid silicon evanescent waveguide for varying thickness of the bonding layer in accordance with one or more embodiments.

Referring now to FIG. 4, a graph of the overlap of optical mode with silicon and multiple quantum well (MQW) region of a hybrid silicon evanescent waveguide for varying thickness of the bonding layer in accordance with one or more embodiments will be discussed. In plot 400 of FIG. 4, the percentage of silicon overlap and MQW well overlap percentages are represented on the vertical axes versus the thickness of bonding layer 120 (BCB thickness) in nanometers on the horizontal axes. The silicon overlap percentage is represented by the plot using the diamond-shaped data points, and the MQW overlap percentage is represented by the plot using square-shaped data points. The plots of graph 400 were generated using simulations, which show that bonding layer 120 having a thickness of about 100 nm or so may be utilized without significantly affecting the performance of hybrid silicon evanescent device 100 to allow the fabrication of a laser or similar device with greater than about 5% MQW confinement factor. In one or more embodiments, such a 5% or greater MQW confinement factor may be sufficient to achieve lasing where hybrid silicon evanescent device 100 comprises a laser, and which is a larger overlap than typically is achieved by lasers with offset quantum wells. Likewise, as can be seen from graph 400, if bonding layer 120 has a thickness of about 200 nm or greater, there may not be sufficient coupling an optical mode of SO1 wafer 112 with III-V chip 110. However, the data of graph 400 represents merely one example arrangement of hybrid silicon evanescent device 100, and the scope of the claimed subject matter is not limited in this respect.

Figure 5:
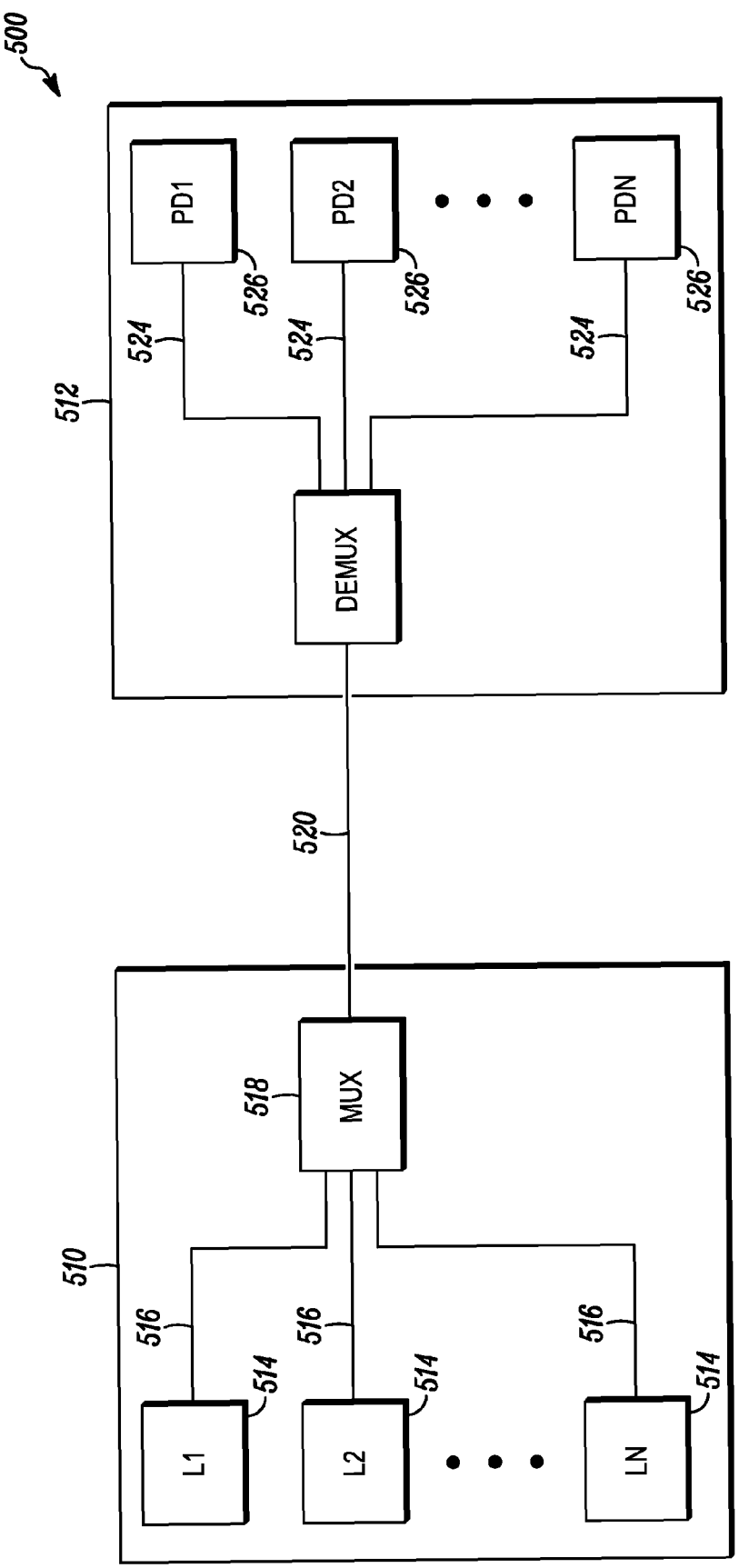
FIG. 5 is block diagram of an optoelectronic system utilizing one or more hybrid silicon evanescent devices in accordance with one or more embodiments.

Referring now to FIG. 5, a block diagram of an optoelectronic system utilizing one or more hybrid silicon evanescent devices in accordance with one or more embodiments will be discussed. In one or more embodiments, optoelectronic system 500 may comprise a transmitter 510 and/or a receiver 512. In some embodiments, transmitter 510 and/or receiver 512 may comprise transceivers including both a transmitter portion such as transmitter 510 and a receiver portion such as receiver 512, although the scope of the claimed subject matter is not limited in this respect. Transmitter 510 may comprise one or more hybrid silicon evanescent devices 100 as shown in FIG. 1. For example, transmitter 510 may comprise one or more lasers 514, up to N number of lasers, coupled to one or more silicon waveguides 516. Lasers 514 may be modulated to generate photonic signals that are transmitted via silicon waveguides 514 to multiplexer 518 to be transmitted via a fiber optic waveguide 520 to a remote device such as receiver 512 as an optical signal. Demultimplexer 522 receives the optical signal from fiber optic waveguide 520 and demultiplexes the signal into individual signals to be routed to corresponding photodetectors 526 via respective silicon waveguides 524. Photodetectors 526 may likewise comprise hybrid silicon evanescent devices 100 as shown in and described with respect to FIG. 1 and arranged to detect light signals. In one or more embodiments, optoelectronic system 500 may comprise part of a telecommunications system, for example to implement longer range transmission of voice and/or data signals, and in one or more alternative embodiments optoelectronic system may comprise part of a computer system to implement, for example, board-to-board, module-to-module, and/or chip-to-chip transmission of data. However, these are merely example applications for optoelectronic system 500 incorporating one or more hybrid silicon evanescent devices 100, and the scope of the claimed subject matter is not limited in these respects.

Referring now to FIG. 6, a table showing example compositions, doping concentrations, and thickness of individual layers of a III-V portion of a hybrid silicon evanescent device in accordance with one or more embodiments will be discussed. The table of FIG. 6 illustrates example composition of the layers of III-V wafer 110 as shown in and described with respect to FIG. 1 and/or FIG. 3. Furthermore, the table of FIG. 6 also illustrates example doping concentration and thickness for the respective layers of III-V wafer 110. It should be noted that the information provided in the table of FIG. 6 is merely one example of how a III-V wafer 110 of hybrid silicon evanescent device 100 could be fabricated, and other compositions, doping concentrations, and/or thicknesses may likewise be utilized, in addition to more or fewer layers of the structure in various arrangements, and the scope of the claimed subject matter is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to evanescent III-V silicon photonics device with spin coat bonding and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A hybrid photonics device, comprising:
   a silicon portion having one or more features formed therein;
   a non-silicon portion comprising one or more photonics devices proximate to the one or more features of the silicon portion, the non-silicon portion comprising a III-V material and a multiple quantum well region; and
   a bonding layer coupling the silicon portion with the non-silicon portion, the bonding layer comprising a thickness of about 100 nanometers, the non-silicon portion being bonded to the silicon portion via the bonding layer prior to patterning of the one or more photonics devices;
   wherein an optical mode of the silicon portion may at least partially overlap with a photonics device in the non-silicon portion to obtain gain from the photonics device in the non-silicon portion, and wherein the non-silicon portion comprising about a 5% multiple quantum well confinement factor.

2. A hybrid photonics device as claimed in claim 1, wherein the bonding layer comprises a liquid adhesive, or a cured liquid adhesive.

3. A hybrid photonics device as claimed in claim 1, wherein the bonding layer comprises spin on glass or DVS-BCB, or combinations thereof.

4. A hybrid photonics device as claimed in claim 1, wherein the silicon portion comprises a silicon-on-insulator wafer.

5. A hybrid photonics device as claimed in claim 1, wherein one or more of the features of the silicon portion comprises a silicon waveguide to couple with one or more photonics devices of the non-silicon portion.

6. A hybrid photonics device as claimed in claim 1, wherein one or more of the photonics devices comprises a laser, a photodetectors, an amplifier, or a wavelength converter, or combinations thereof.

7. A method to form a hybrid photonics device, comprising:
   applying a liquid adhesive to a silicon wafer to form a bonding layer on the silicon wafer, the silicon wafer having one or more features formed therein, and the bonding layer comprising a thickness of about 100 nanometers;
   bonding a non-silicon chip to the silicon wafer via the bonding layer, the non-silicon chip being disposed proximate to the one or more features of the silicon wafer, the non-silicon portion comprising a III-V material and a multiple quantum well region; and
   fabricating one or more photonics devices in the silicon chip after said bonding to couple one or more photonics devices with one or more features of the silicon wafer, to form a hybrid photonics device, wherein an optical mode of the silicon wafer may at least partially overlap with a photonics device in the non-silicon chip to obtain gain from the photonics device in the non-silicon chip, and wherein the non-silicon portion comprises about a 5% multiple quantum well confinement factor.

8. A method to form a hybrid photonics device as claimed in claim 7, further comprising finishing processing of the hybrid photonics device after said fabricating.

9. A method to form a hybrid photonics device as claimed in claim 7, further comprising curing the liquid adhesive after said bonding.

10. A method to form a hybrid photonics device as claimed in claim 7, said applying a liquid adhesive comprising spin coating the liquid adhesive on the silicon wafer.

11. A method to form a hybrid photonics device as claimed in claim 7, said bonding being performed without involving direct oxide molecular bonding.

12. A method as claimed in claim 7, said one or more features formed in the silicon wafer comprising a silicon waveguide for one or more of the photonics devices.

13. A photonics system, comprising:
   an optical transmitter comprising one or more hybrid photonics devices, or an optical receiver comprising one or more hybrid photonics devices, or combinations of a transmitter and a receiver;
   wherein the one or more hybrid photonics devices of the optical transmitter or the optical receiver, or combinations thereof, comprises:
   a silicon portion having one or more features formed therein;
   a non-silicon portion comprising one or more photonics devices proximate to the one or more features of the silicon portion, the non-silicon portion comprising a III-V material and a multiple quantum well region; and
   a bonding layer coupling the silicon portion with the non-silicon portion, the non-silicon portion being bonded to the silicon portion via the bonding layer prior to patterning of the one or more photonics devices, the bonding layer comprising a thickness of about 100 nanometers;
   wherein an optical mode of the silicon portion may at least partially overlap with a photonics device in the non-silicon portion to obtain gain from the photonics device in the non-silicon portion, and wherein the non-silicon portion comprising about a 5% multiple quantum well confinement factor.

14. A photonics system as claimed in claim 13, wherein the bonding layer comprises a liquid adhesive, or a cured liquid adhesive, the liquid adhesive comprising spin on glass or DVS-BCB, or combinations thereof.

15. A photonics system as claimed in claim 13, wherein the silicon portion comprises a silicon-on-insulator wafer.

16. A photonics system as claimed in claim 13, wherein one or more of the photonics devices comprises a laser, a photodetectors, an amplifier, or a wavelength converter, or combinations thereof.

17. A photonics system as claimed in claim 13, further comprising:
   a multiplexer to combine outputs of one or more of the hybrid photonics devices of the optical transmitter into a combined optical signal, or a demultiplexer to provide one or more signals from a combined optical signal to a corresponding one or more of the hybrid photonics devices of the optical receiver, or a combination of a multiplexer and a demultiplexer.

* * * * *